(12) United States Patent
More et al.

(10) Patent No.: US 9,300,933 B2
(45) Date of Patent: Mar. 29, 2016

(54) PREDICTIVE ENHANCEMENT OF A PORTION OF VIDEO DATA RENDERED ON A DISPLAY UNIT ASSOCIATED WITH A DATA PROCESSING DEVICE

(71) Applicant: NVIDIA Corporation, Santa Clara, CA (US)

(72) Inventors: Nilesh More, Maharashtra (IN); Anup Rathi, Maharashtra (IN)

(73) Assignee: NVIDIA Corporation, Santa Clara, CA (US)

(*) Notice: Subject to any disclaimer, the term of this patent is extended or adjusted under 35 U.S.C. 154(b) by 273 days.

(21) Appl. No.: 13/912,221

(22) Filed: Jun. 7, 2013

(65) Prior Publication Data
US 2014/0362296 A1 Dec. 11, 2014

(51) Int. Cl.
*H04N 9/64* (2006.01)
*G09G 3/34* (2006.01)
*G09G 5/14* (2006.01)
*G09G 5/395* (2006.01)
*H04N 5/14* (2006.01)
*H04N 5/208* (2006.01)
*H04N 7/01* (2006.01)

(52) U.S. Cl.
CPC .............. *H04N 9/646* (2013.01); *G09G 3/3406* (2013.01); *G09G 5/14* (2013.01); *G09G 5/395* (2013.01); *H04N 5/145* (2013.01); *H04N 5/208* (2013.01); *H04N 7/012* (2013.01); *G09G 2340/14* (2013.01); *G09G 2360/12* (2013.01)

(58) Field of Classification Search
CPC ......... G06T 17/20; G06T 15/00; G06T 15/04; G06T 2210/36; G09G 5/391
See application file for complete search history.

(56) References Cited

U.S. PATENT DOCUMENTS

| 5,481,275 | A | 1/1996 | Mical et al. | |
|---|---|---|---|---|
| 6,078,349 | A | 6/2000 | Molloy | |
| 6,191,772 | B1 | 2/2001 | Mical et al. | |
| 6,466,624 | B1 | 10/2002 | Fogg | |
| 6,940,905 | B2* | 9/2005 | Van Der Schaar et al. | 375/240.12 |
| 7,492,819 | B2* | 2/2009 | Honda et al. | 375/240.03 |
| 8,330,831 | B2 | 12/2012 | Steinberg et al. | |
| 8,345,756 | B2 | 1/2013 | Lyashevsky et al. | |
| 2007/0242748 | A1* | 10/2007 | Mahadevan | H04N 19/85 375/240.14 |
| 2009/0034854 | A1* | 2/2009 | Lee et al. | 382/236 |
| 2009/0201313 | A1* | 8/2009 | Thorn | 345/620 |

(Continued)

FOREIGN PATENT DOCUMENTS

TW 201301252 A 1/2013

OTHER PUBLICATIONS

Office Action from Taiwan Patent Application No. 102148393, dated Jul. 22, 2015.

(Continued)

*Primary Examiner* — Todd Buttram
(74) *Attorney, Agent, or Firm* — Zilka-Kotab, PC

(57) ABSTRACT

A method includes predicting, through a processor of a data processing device communicatively coupled to a memory, a portion of a video frame on which a user of the data processing device is likely to focus on during rendering thereof on a display unit associated with the data processing device. The video frame is part of decoded video data. The method also includes rendering, through the processor, the portion of the video frame on the display unit at an enhanced level compared to other portions thereof following the prediction of the portion of the video frame.

21 Claims, 4 Drawing Sheets

(56) References Cited

U.S. PATENT DOCUMENTS

| | | | |
|---|---|---|---|
| 2009/0244093 A1* | 10/2009 | Chen et al. | 345/620 |
| 2009/0322915 A1* | 12/2009 | Cutler | 348/251 |
| 2010/0039618 A1 | 2/2010 | De Lemos | |
| 2011/0210931 A1* | 9/2011 | Shai | 345/173 |
| 2011/0267422 A1 | 11/2011 | Garcia et al. | |
| 2012/0269393 A1* | 10/2012 | Komoto et al. | 382/103 |
| 2013/0009980 A1* | 1/2013 | Gu | 345/611 |
| 2014/0123162 A1* | 5/2014 | Karlsson et al. | 725/12 |
| 2014/0313103 A1* | 10/2014 | Goel et al. | 345/2.2 |

OTHER PUBLICATIONS

Ivanovski, Z. A. et al., "Super-resolution video enhancement based on a constrained set of motion vectors," Proc. of SPIE, vol. 5817, pp. 124-132.

* cited by examiner

US 9,300,933 B2

PREDICTIVE ENHANCEMENT OF A PORTION OF VIDEO DATA RENDERED ON A DISPLAY UNIT ASSOCIATED WITH A DATA PROCESSING DEVICE

FIELD OF TECHNOLOGY

This disclosure relates generally to video post-processing and, more particularly, to a method, a device and/or a system of predictive enhancement of a portion of video data rendered on a display unit associated with a data processing device.

BACKGROUND

A data processing device (e.g., a desktop computer, a laptop computer, a notebook computer, a netbook, a mobile device such as a mobile phone) may render video data on a display unit (e.g., Liquid Crystal Display (LCD)) associated therewith. In order to enhance a user experience during viewing of the video data, the data processing device may execute one or more post-processing algorithms to adjust video quality appropriately. The execution of the one or more post-processing algorithms may be computationally expensive, resulting in video frame-drops. Said video frame-drops may be detrimental to the user experience, despite the one or more post-processing algorithms being executed to enhance the user experience.

SUMMARY

Disclosed are a method, a device and/or a system of predictive enhancement of a portion of video data rendered on a display unit associated with a data processing device.

In one aspect, a method includes predicting, through a processor of a data processing device communicatively coupled to a memory, a portion of a video frame on which a user of the data processing device is likely to focus on during rendering thereof on a display unit associated with the data processing device. The video frame is part of decoded video data. The method also includes rendering, through the processor, the portion of the video frame on the display unit at an enhanced level compared to other portions thereof following the prediction of the portion of the video frame.

In another aspect, a non-transitory medium, readable through a data processing device and including instructions embodied therein that are executable through the data processing device, is disclosed. The non-transitory medium includes instructions to predict, through a processor of the data processing device communicatively coupled to a memory, a portion of a video frame on which a user of the data processing device is likely to focus on during rendering thereof on a display unit associated with the data processing device. The video frame is part of decoded video data. The non-transitory medium also includes instructions to render, through the processor, the portion of the video frame on the display unit at an enhanced level compared to other portions thereof following the prediction of the portion of the video frame.

In yet another aspect, a data processing device includes a memory having decoded video data therein, a display unit, and a processor communicatively coupled to the memory. The processor is configured to execute instructions to: predict a portion of a video frame of the decoded video data on which a user of the data processing device is likely to focus on during rendering thereof on the display unit, and render the portion of the video frame on the display unit at an enhanced level compared to other portions thereof following the prediction of the portion of the video frame.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, a device and/or a system of predictive enhancement of a portion of video data rendered on a display unit associated with a data processing device. Although the present embodiments have been described with reference to specific example embodiments, it will be evident that various modifications and changes may be made to these embodiments without departing from the broader spirit and scope of the various embodiments.

Figure 1:
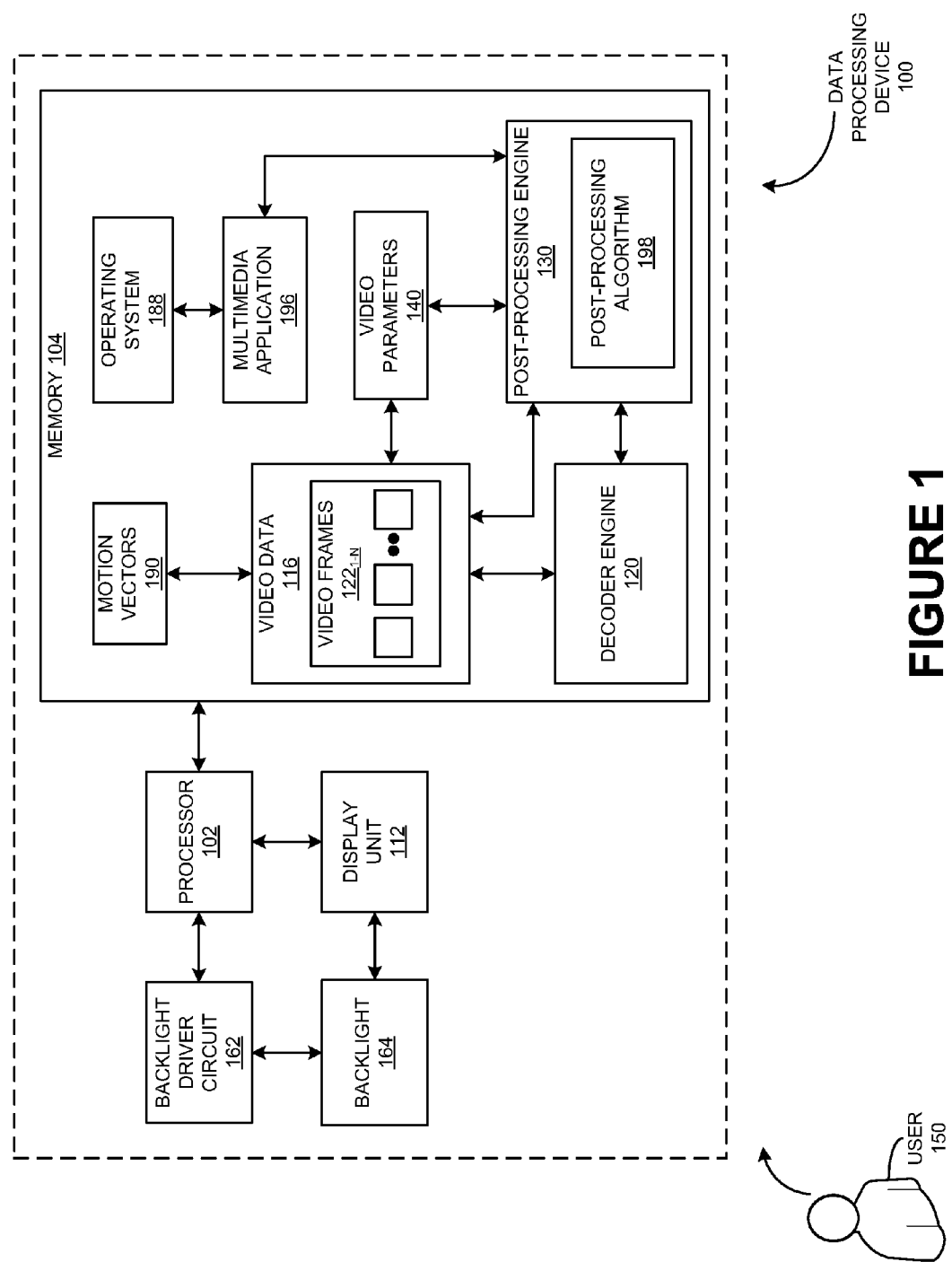
FIG. 1 is a schematic view of a data processing device, according to one or more embodiments.

FIG. 1 shows a data processing device 100, according to one or more embodiments. In one or more embodiments, data processing device 100 may be a laptop computer, a desktop computer, a notebook computer, a netbook, a tablet or a mobile device such as a mobile phone. Other forms of data processing device 100 are within the scope of the exemplary embodiments discussed herein. In one or more embodiments, data processing device 100 may include a processor 102 (e.g., a Central Processing Unit (CPU), a Graphics Processing Unit (GPU)) communicatively coupled to a memory 104 (e.g., a volatile memory and/or a non-volatile memory); memory 104 may include storage locations configured to be addressable through processor 102.

In one or more embodiments, memory 104 of data processing device 100 may include video data 116 (e.g., video data 116 may be downloaded and locally stored in memory 104; video data 116 (e.g., a video stream, a file) may be transmitted from a data source) therein. In one or more embodiments, processor 102 may perform appropriate processing (e.g., data conversion) on video data 116 to enable rendering thereof on a display unit 112 associated with data processing device 100;

FIG. 1 shows display unit 112 as being interfaced with processor 102. In one or more embodiments, processor 102 may execute a decoder engine 120 (e.g., a set of instructions) to decode video data 116 prior to rendering thereof. In one or more embodiments, a post-processing engine 130 may also execute on processor 102; post-processing engine 130 may be configured to receive an output of decoder engine 120 and perform appropriate processing thereon prior to rendering thereof on display unit 112 to reduce power consumption through data processing device 100, as will be discussed below.

A user 150 of data processing device 100 may mostly direct attention toward a small portion of a visual field thereof on display unit 112. User vision may utilize a fovea of an eye thereof to focus on the small portion of the visual field. The remaining portion of the visual field may be covered through peripheral vision; peripheral vision may mainly be responsible for motion detection and may not be very sensitive to details in the visual field. In other words, user 150 may not pay attention to fine details (e.g., color details, edges that denote an intensity level transition between pixels of a video frame) in a large portion of the visual field covered through the peripheral vision. In one or more embodiments, the aforementioned characteristics of human vision (or, user vision) may be exploited during post-processing of decoded video data 116 to result in power savings.

In one or more alternate embodiments, post-processing engine 130 may be part of decoder engine 120; FIG. 1 shows post-processing engine 130 and decoder engine 120 separately merely for example purposes. FIG. 1 also shows parameters (e.g., video parameters 140) associated with video frames $122_{1-N}$ (e.g., shown as being part of video data 116) being stored in memory 104. Exemplary embodiments discussed herein may enhance video parameters 140 within the small portion of the visual field to provide for power savings.

Figure 2:
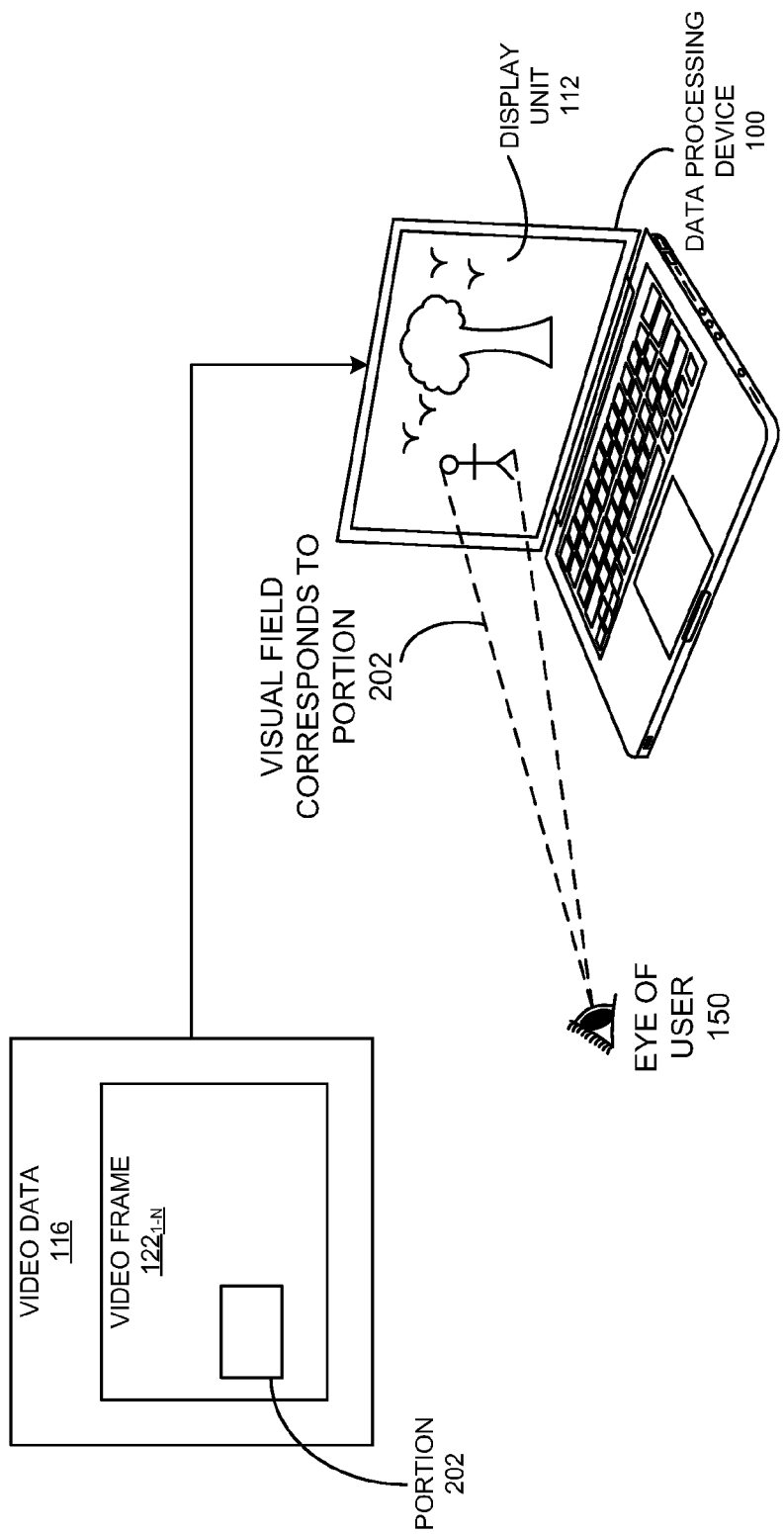
FIG. 2 is a schematic view of a portion of video data to be rendered on a display unit of the data processing device of FIG. 1 on which a user is most likely to focus, according to one or more embodiments.

FIG. 2 shows a portion 202 of video data 116 to be rendered on display unit 112 on which user 150 is most likely to focus, according to one or more embodiments. In one or more embodiments, in order to determine portion 202 of a video frame $122_{1-N}$ of video data 116, motion vectors 190 associated with video frame $122_{1-N}$ may be analyzed through processor 102. In one or more embodiments, motion vectors 190 may represent macroblocks of video frame $122_{1-N}$ based on position(s) thereof on one or more reference video frames $122_{1-N}$. In one or more embodiments, processor 102 may analyze motion vectors 190 to detect/estimate the portion (e.g., portion 202) of video frame $122_{1-N}$ associated with high activity (e.g., activity above a threshold). As user 150 is most likely to focus on "on screen" areas of display unit 112 with high activity, portion 202 may be determined based on high magnitude of motion vectors 190 and/or high density thereof.

It should be noted that the abovementioned determination of portion 202 is not limited to analyzing motion vectors 190. In an example scenario of video data 116 being a movie, user 150 may most likely focus on a speaker (e.g., a lead character in the movie). Therefore, portion 202 may be determined (e.g., through processor 102) through analyzing audio content of video frame $122_{1-N}$. In one or more embodiments, accuracy of the determination of portion 202 may further be improved based on data collected from previous executions/processing.

In one or more embodiments, prior to the rendering of decoded video frame $122_{1-N}$, processor 102 may be configured to apply a post-processing algorithm 198 (or, a set of post-processing algorithms 198; post-processing algorithm is shown as being part of post-processing engine 130) thereon to enhance video quality associated with portion 202. In one or more embodiments, post-processing algorithm 198 may incorporate elements such as noise reduction, edge enhancement, dynamic color/contrast adjustment, software processing amplifier (procamp) adjustment and deinterlacing and/or enhancement/scaling of video parameters 140 (e.g., resolution). Other elements of post-processing algorithm 198 are within the scope of the exemplary embodiments discussed herein.

In one or more embodiments, the estimation/detection of portion 202 and/or the rendering of portion 202 at an enhanced level may be initiated through a driver component (e.g., a set of instructions; to be discussed below) associated with processor 102 and/or display unit 112. In one or more embodiments, post-processing algorithm 198 may not be required to be applied to the complete video frame $122_{1-N}$; mere application thereof to portion 202 may suffice as user 150 may not perceive the difference between the enhanced portion 202 of video frame $122_{1-N}$ and non-enhanced portions of video frame $122_{1-N}$. In one or more embodiments, the size of the area of display unit 112 on which user 150 is most likely to focus may vary depending on the size of display unit 112. For handheld devices such as tablets and smart phones, the aforementioned area of focus may be comparable to the size of the visual field of user 150; therefore, effectiveness of the processes discussed above may increase with increased size of display unit 112.

It should be noted that executing complex post-processing algorithms 198 on entire video frames $122_{1-N}$ may be limited by factors such as processing power, thereby resulting in frame-drops. Exemplary embodiments provide for a means to execute complex post-processing algorithms 198 without the aforementioned problem as the complexity is localized to portion 202. Alternately, a complex post-processing algorithm 198 may be applied on portion 202 and a less complex post-processing algorithm 198 may be applied to other portions of video frame $122_{1-N}$.

Also, it should be noted that enhancing video quality as discussed above is not limited to rendering portion 202 at an enhanced level. In an example embodiment, portion 202 may be rendered in a normal mode of operation and other portions of video frame $122_{1-N}$ may be rendered at a reduced level. Such variations are within the scope of the exemplary embodiments discussed herein. Further, rendering portion 202 at an enhanced level includes processing associated with increasing intensity level of a backlight 164 of display unit 112 on the corresponding area/portion on the "screen" thereof. FIG. 1 shows a backlight driver circuit 162 of backlight 164 as being interfaced with processor 102. Upon detection/estimation of portion 202, processor 102 may be configured to transmit a control signal to backlight driver circuit 162 to increase the intensity level of backlight 164 for the portion "onscreen" corresponding to portion 202. Alternately, backlight driver circuit 162 may maintain the intensity level of backlight 164 for the portion "onscreen" corresponding to portion 202 and reduce the intensity for other portions.

Figure 3:
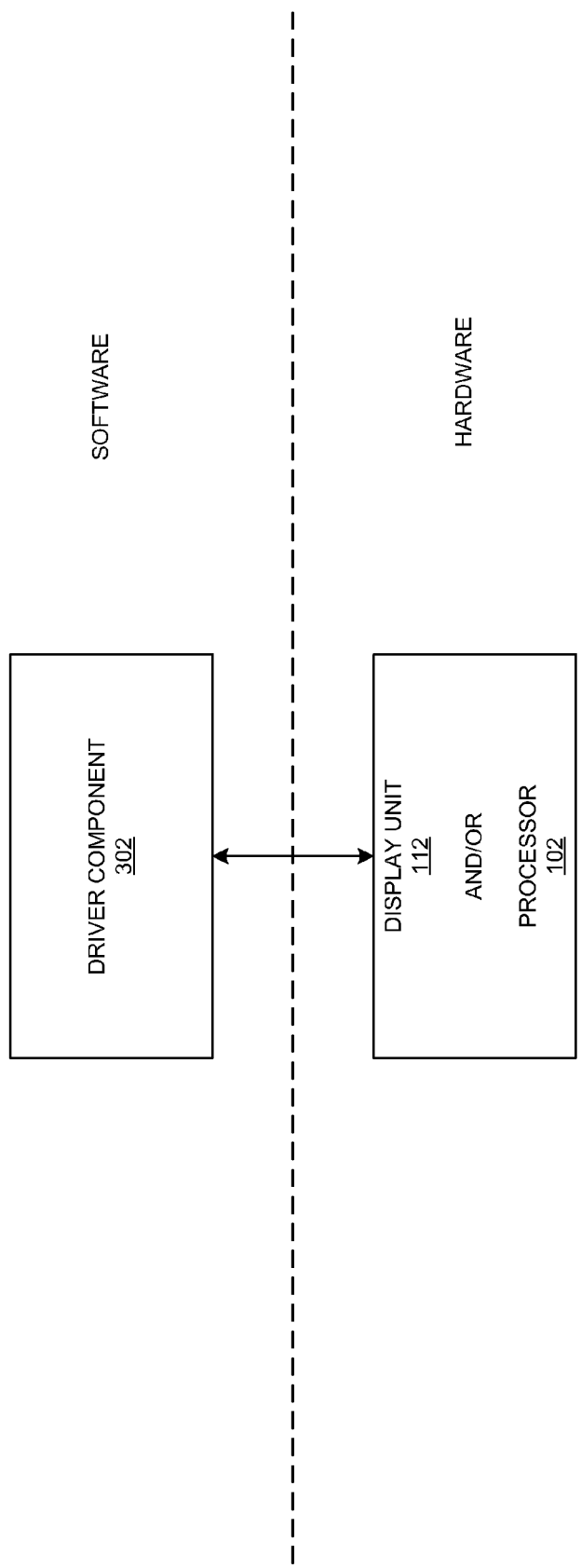
FIG. 3 is a schematic view of interaction between a driver component and a processor and/or the display unit of the data processing device of FIG. 1, according to one or more embodiments.

FIG. 3 shows interaction between a driver component 302 and processor 102 and/or display unit 112, according to one or more embodiments. In one or more embodiments, driver component 302 may be configured to initiate the detection/estimation of portion 202 and/or the rendering of portion 202 at an enhanced level on display unit 112. An example scenario triggering the aforementioned processes may include user 150 switching data processing device 100 from an Alternating Current (AC) mode of operation to a battery mode of operation thereof. The aforementioned switching may be detected through processor 102 in conjunction with driver component 302. Alternately, processor 102 may be configured to periodically poll a battery of data processing device 100 for the mode of operation thereof (or, processor 102 may obtain the mode of operation through an operating system 188 executing on data processing device 100). Once the battery mode is detected through driver component 302 in conjunction with processor 102, the processes discussed above may be initiated.

Also, user 150 may initiate the abovementioned processes through a physical button provided on data processing device 100 and/or a user interface of an application (e.g., multimedia application 196 shown as being part of memory 104) executing on data processing device. In one or more embodiments, driver component 302 may be packaged with operating system 188 (e.g., again, shown as being part of memory 104) executing on data processing device 100 and/or multimedia application 196. Further, instructions associated with driver component 302 and/or post-processing algorithm 198 may be tangibly embodied on a non-transitory medium (e.g., a Compact Disc (CD), a Digital Video Disc (DVD), a Blu-ray disc®, a hard drive; appropriate instructions may be downloaded to the hard drive) readable through data processing device 100.

Figure 4:
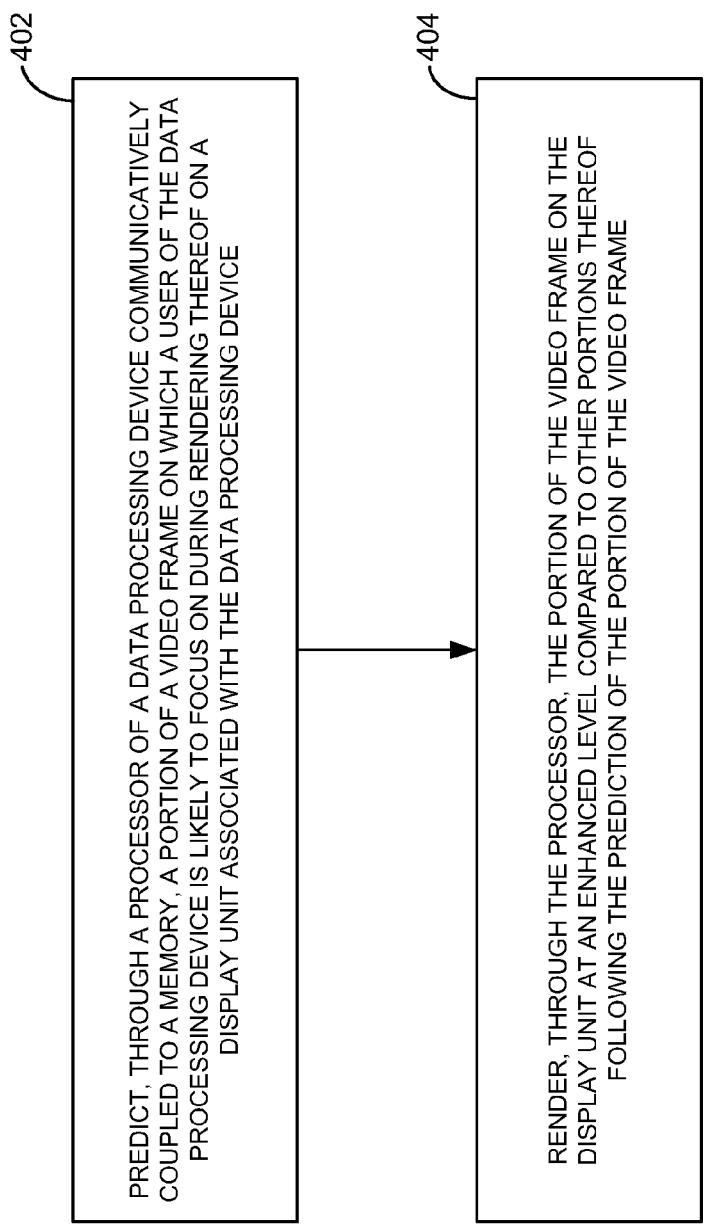
FIG. 4 is a process flow diagram detailing the operations involved in predictive enhancement of a portion of video data rendered on a display unit associated with the data processing device of FIG. 1, according to one or more embodiments.

FIG. 4 shows a process flow diagram detailing the operations involved in predictive enhancement of portion 202 of video data 116 rendered on display unit 112 associated with data processing device 100, according to one or more embodiments. In one or more embodiments, operation 402 may involve predicting, through processor 102, portion 202 of video frame $122_{1-N}$ on which user 150 is likely to focus on during rendering thereof on display unit 112. In one or more embodiments, video frame $122_{1-N}$ may be part of decoded video data 116. In one or more embodiments, operation 404 may then involve rendering, through processor 102, portion 202 of video frame $122_{1-N}$ on display unit 112 at an enhanced level compared to other portions thereof following the prediction of portion 202 of video frame $122_{1-N}$.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a non-transitory machine-readable medium). For example, the various electrical structure and methods may be embodied using transistors, logic gates, and electrical circuits (e.g., application specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., data processing device 100). Accordingly, the specification and drawings are to be regarded in an illustrative rather than a restrictive sense.

What is claimed is:

1. A method comprising:
    detecting a battery mode of operation of a data processing device;
    in response to detecting the battery mode of operation of the data processing device:
        (a) predicting, through a processor of the data processing device communicatively coupled to a memory, a portion of a video frame on which a user of the data processing device is likely to focus on during rendering thereof on a display unit associated with the data processing device, the video frame being part of decoded video data; and
        (b) rendering, through the processor, the portion of the video frame on the display unit at an enhanced level compared to other portions thereof following the prediction of the portion of the video frame;
    wherein the portion of the video frame is predicted through at least one of:
        the processor analyzing motion vectors associated with the video frame and determining from the analyzing that the portion includes activity above a threshold, and
        the processor analyzing audio content associated with the video frame.

2. The method of claim 1, wherein rendering the portion of the video frame at the enhanced level includes at least one of:
    enhancing video quality associated with the portion through at least one of: noise reduction, edge enhancement, dynamic color adjustment, dynamic contrast adjustment, software processing amplifier adjustment, deinterlacing and scaling at least one video parameter associated with the portion;
    transmitting a control signal to a backlight driver circuit of a backlight of the display unit to adjust an intensity level of the backlight corresponding to at least one of the portion of the video frame and the other portions thereof; and
    maintaining the video quality associated with the portion of the video frame and reducing video quality associated with the other portions thereof.

3. The method of claim 1, further comprising initiating the rendering thereof at the enhanced level through a driver component associated with at least one of the processor and the display unit.

4. The method of claim 3, comprising providing the driver component through at least one of: packaging thereof with an operating system executing on the data processing device and packaging thereof with an application executing on the data processing device.

5. The method of claim 1, further comprising improving accuracy of the prediction based on data collected from a previous execution associated therewith.

6. The method of claim 1, wherein the portion of the video frame is predicted through the processor analyzing the motion vectors associated with the video frame and determining from the analyzing that the portion includes the activity above the threshold.

7. The method of claim 1, wherein the portion of the video frame is predicted through the processor analyzing the audio content associated with the video frame.

8. The method of claim 1, further comprising initiating the prediction of the portion through a driver component associated with at least one of the processor and the display unit.

9. A non-transitory medium, readable through a data processing device and including instructions embodied therein that are executable through the data processing device, comprising:
    instructions to detect a battery mode of operation of the data processing device;
    responsive to detecting the battery mode of operation of the data processing device:
        (a) instructions to predict, through a processor of the data processing device communicatively coupled to a memory, a portion of a video frame on which a user of the data processing device is likely to focus on during rendering thereof on a display unit associated with the data processing device, the video frame being part of decoded video data; and (b) instructions to render, through the processor, the portion of the video frame on the display unit at an enhanced level compared to other portions thereof following the prediction of the portion of the video frame;

wherein the portion of the video frame is predicted through at least one of:

the processor analyzing motion vectors associated with the video frame and determining from the analyzing that the portion includes activity above a threshold, and the processor analyzing audio content associated with the video frame.

10. The non-transitory medium of claim 9, wherein instructions to render the portion of the video frame at the enhanced level includes at least one of:

instructions to enhance video quality associated with the portion through at least one of: noise reduction, edge enhancement, dynamic color adjustment, dynamic contrast adjustment, software processing amplifier adjustment, deinterlacing and scaling at least one video parameter associated with the portion, instructions to transmit a control signal to a backlight driver circuit of a backlight of the display unit to adjust an intensity level of the backlight corresponding to at least one of the portion of the video frame and the other portions thereof, and instructions to maintain the video quality associated with the portion of the video frame and to reduce video quality associated with the other portions thereof.

11. The non-transitory medium of claim 9, further comprising instructions to initiate the rendering thereof at the enhanced level through a driver component associated with at least one of the processor and the display unit.

12. The non-transitory medium of claim 9, further comprising instructions to improve accuracy of the prediction based on data collected from a previous execution associated therewith.

13. A data processing device comprising:
a memory comprising decoded video data therein;
a display unit; and
a processor communicatively coupled to the memory, the processor being configured to execute instructions to:
detect a battery mode of operation of the data processing device;
in response to detecting the battery mode of operation of the data processing device:
(a) predict a portion of a video frame of the decoded video data on which a user of the data processing device is likely to focus on during rendering thereof on the display unit, and
(b) render the portion of the video frame on the display unit at an enhanced level compared to other portions thereof following the prediction of the portion of the video frame;

wherein the portion of the video frame is predicted through at least one of:

the processor analyzing motion vectors associated with the video frame and determining from the analyzing that the portion includes activity above a threshold, and the processor analyzing audio content associated with the video frame.

14. The data processing device of claim 13, wherein the processor is configured to render the portion of the video frame at the enhanced level through at least one of:

enhancing video quality associated with the portion through at least one of: noise reduction, edge enhancement, dynamic color adjustment, dynamic contrast adjustment, software processing amplifier adjustment, deinterlacing and scaling at least one video parameter associated with the portion, transmitting a control signal to a backlight driver circuit of a backlight of the display unit to adjust an intensity level of the backlight corresponding to at least one of the portion of the video frame and the other portions thereof, and maintaining the video quality associated with the portion of the video frame and reducing video quality associated with the other portions thereof.

15. The data processing device of claim 13, further comprising a driver component associated with at least one of the processor and the display unit to initiate at least one of the prediction of the portion and the rendering thereof at the enhanced level.

16. The data processing device of claim 15, wherein the driver component is at least one of: packaged with an operating system executing on the data processing device and packaged with an application executing on the data processing device.

17. The data processing device of claim 13, wherein the processor is further configured to execute instructions to improve accuracy of the prediction based on data collected from a previous execution associated therewith.

18. The method of claim 6, wherein the activity above the threshold includes a magnitude of the motion vectors being above the threshold.

19. The method of claim 6, wherein the activity above the threshold includes a density of the motion vectors being above the threshold.

20. The method of claim 7, wherein the portion of the video frame is further predicted through the processor determining from the analyzing that the audio corresponding to the portion of the video frame satisfies a predefined condition indicative of the user being likely to focus on the corresponding portion of the video frame.

21. The method of claim 1, wherein initiation of the prediction is triggered upon the detection of the data processing device switching from an Alternating Current (AC) mode of operation to the battery mode of operation.

* * * * *